Figure 1:
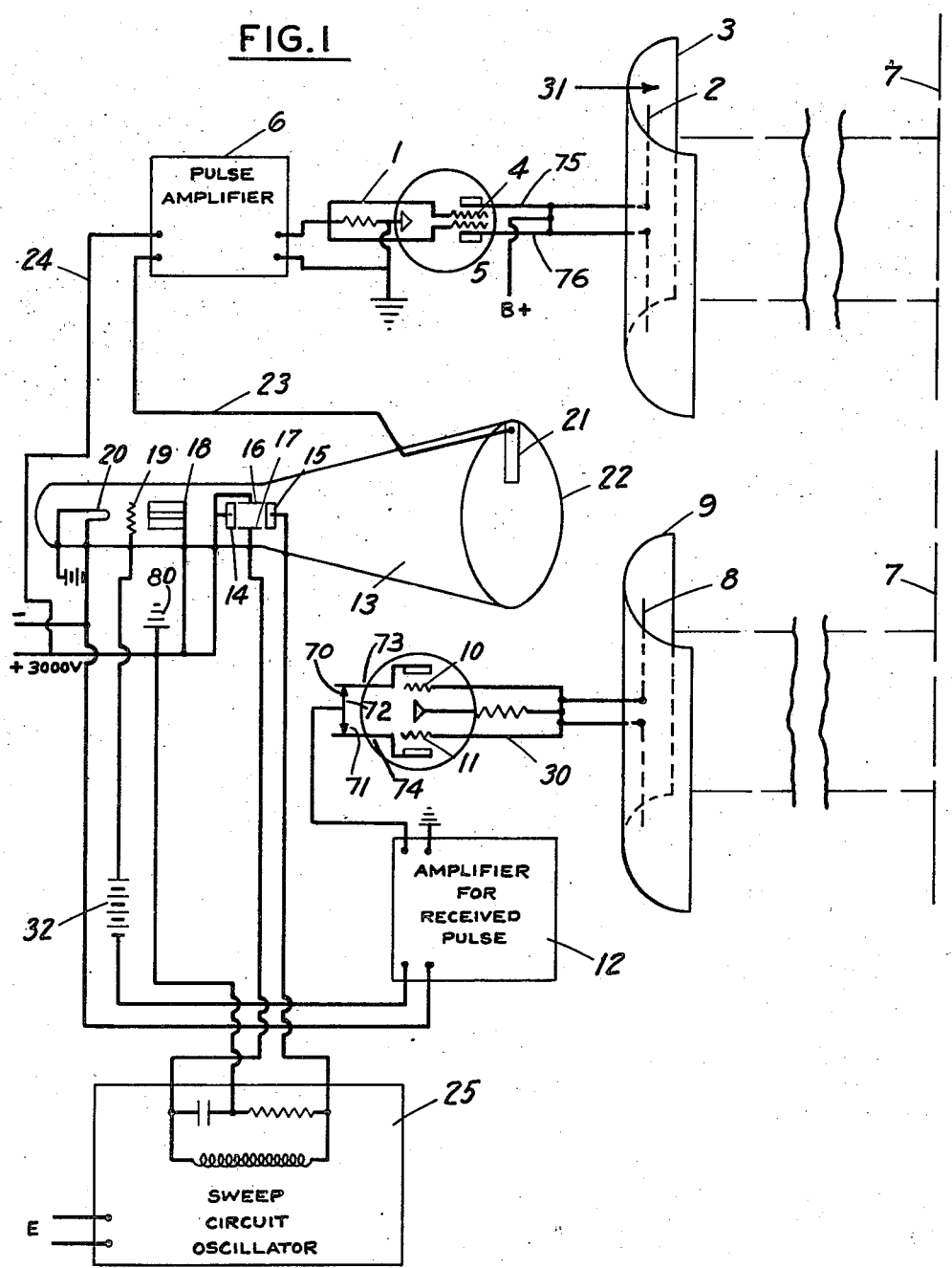

Sept. 10, 1946.    R. W. HART    2,407,273
METHOD AND MEANS FOR DISTANCE AND DIRECTION FINDING
Filed March 5, 1935    2 Sheets-Sheet 2

INVENTOR.
ROBERT W. HART.
BY
ATTORNEY.

UNITED STATES PATENT OFFICE 2,407,273

METHOD AND MEANS FOR DISTANCE AND DIRECTION FINDING

Robert W. Hart, Lynn, Mass., assignor, by mesne assignments, to Submarine Signal Company, Boston, Mass., a corporation of Delaware Application March 5, 1935, Serial No. 9,459

9 Claims. (Cl. 250—1)

The present invention relates to distance measurement and in particular with the use of electromagnetic waves. It is particularly applicable to measurement of heights from an aircraft and also to the measurement of distance of an aircraft from some point of observation.

The invention may also apply to the measurement of distances at sea between a vessel equipped with the invention and another distant vessel within the range of the apparatus.

Not only may the present invention be applied to distance measurement but it may also be applied to direction finding and in such cases furnish accurate knowledge of the position of a distant object. While it is true that for measurement of distances of vessels the necessity of finding practically instantaneous observations is not so essential, nevertheless in the measurement of heights of aircrafts and the location of aircrafts from the ground observation station, the factor of velocities and time used in the measuring methods becomes very important. With measurements by the use of sound waves under such conditions, particularly with the increase of velocities of aircrafts, the velocities of the aircraft as compared with the velocities of sound, if sound is used as a measuring means, may be as high as 20%. In other words, an aircraft determining its height at, say, a distance of 1000 feet, may have moved a position of 200 feet from the point at which the measurement is begun. If the sound wave, therefore, was sent out in a beam, it would under many circumstances not be returned to a position to be received by the aircraft in its flight and the measurement of distance by sonic methods under these conditions might be seriously impaired. It is easily understood, therefore, how directive compressional wave signaling for this purpose may readily fail.

It is also true, particularly at high speeds, that a good deal of extraneous sound is present and this makes it necessary either to have a compressional wave producer of high power or to go to such frequencies where the attenuation in the air is very great. Due to these factors and due also to the fact that the apparatus itself is quite heavy and quite bulky, it may safely be said that no practical height-measuring device using compressional-wave means has at the present time been developed.

The present invention, as has been stated, employs electromagnetic waves and applies as its principle of operation the transmission of a short train of electromagnetic waves at very high frequencies towards the object whose distance is to be measured and the measurement of the time interval between the transmission of such an impulse and the return of its reflected echo or wave. It is usually assumed that the transmission of electromagnetic waves for most measuring purposes is instantaneous and under this assumption distance has been measured by the use of synchronized sound and radio signals.

However, it is a known fact that electromagnetic waves travel with the velocity of light, and it will, therefore, be understood that by measurement of the time interval between the transmission and the reception of the corresponding electromagnetic wave impulses, the remoteness of a distant object may be measured. Assuming the velocity of electromagnetic waves 300,000,000 meters per second, it will be appreciated that for the measurement of a distance of 30 meters, the time interval of $1/10,000,000$ of a second must be measured, and that for a measurement of a distance of, say, 50 feet, the time interval is even shorter. In the present invention these time intervals are directly and accurately measured and with such accuracy that the apparatus may be generally commercially used.

Figure 2:
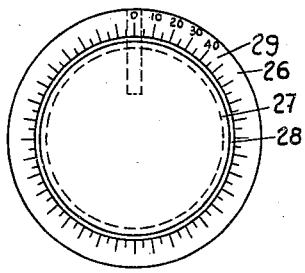
Figure 3:
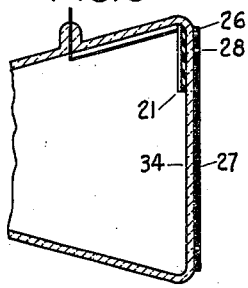
Figure 4:
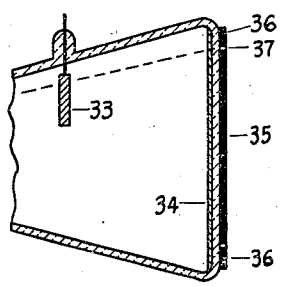
Figure 5:
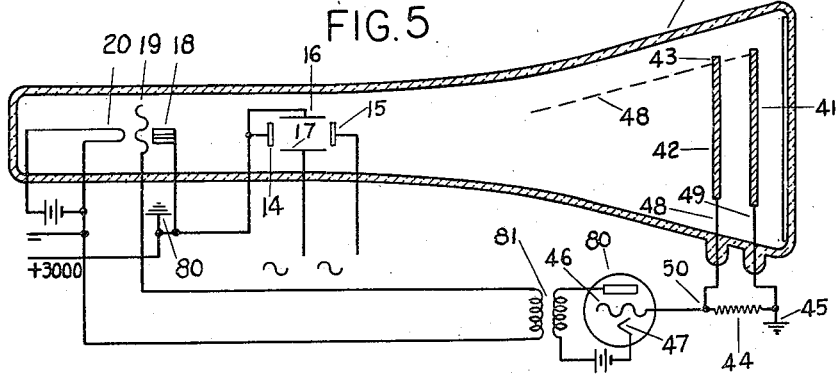
Figure 6:
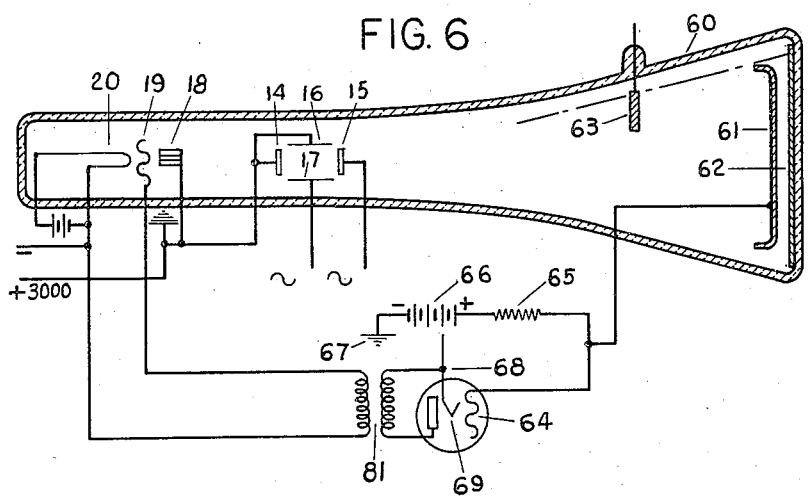

The present invention will be more fully described in connection with the drawings in which Fig. 1 shows schematically the system; Fig. 2 shows a detail of the indicator; Fig. 3 shows a further detail of the indicator; Fig. 4 shows a modification of the detail of Fig. 3; Fig. 5 shows a sectional view of a modified detail of that indicated in Fig. 3; and Fig. 6 shows a further modification in a view similar to that shown in Fig. 3.

In Fig. 1 the electromagnetic impulses may be sent out by a directive transmitter which includes a very high frequency oscillator 1 which is preferably shorter than 1 meter. This oscillator is designed to produce continuous waves and has been used at a wave length of 60 cms. The transmitter may be provided with an antenna 2 of the form known as a doublet and may be made directional by making the antenna 2 the focus of a paraboloid 3. Other directive systems may be used such as an antenna array in which a reflector, such as paraboloid 3, is omitted and the directive effect is obtained by the group of antenna alone.

While the oscillator 1 is of the continuous type, it is not, however, allowed to oscillate except momentarily when the grids 4 and 5 are made sufficiently positive by means of the pulse amplifier 6 which will be explained later. At these instances the grid potential upon the grids 4 and 5 become sufficiently positive so that the oscillator may continue to operate at its resonant frequency, The impulse transmitted by the directive system may travel in a ray or beam to a distant object or surface 7 or the radiation may be in all directions if no directive system is used. The wave reflected from the surface or object 7 is picked up by the receiving antenna 8 which may similarly, as the antenna 2, be located at the focus of a paraboloid 9 of the pick-up system.

The impulse received or picked up by the antenna 8 is impressed upon the grids 10 and 11 of the radio receiver which preferably is of the same type as the transmitter just previously described. This receiver should preferably be tuned to the frequency that the transmitter is and in the present case has been usually adjusted to a wave length of less than a meter, 60 cms. having been found workable in the present case.

Both transmitters and receivers may be readily tuned and, as indicated in Fig. 1, the tuning of the receiver is accomplished by the adjustment of the slipping contacts 70 and 71 at opposite ends of the bar 72. By this means plate conductors 73 and 74 may be adjusted in length to provide proper plate tuning for the circuits. The transmitter may be similarly adjusted by adjusting the B+ taps along the plate conductors 75 and 76. The adjustment of the length of the conductors 75 and 76 and also conductors 73 and 74 may be accomplished by means of hollow telescopic tubes, or, if desired, an actual wiping contact may be made.

The impulse from the radio pickup unit is impressed upon the amplifier 12 before being impressed upon the indicator or measuring system. The indicator or measuring system includes a cathode ray tube 13 which is preferably of the type that is quick acting and will produce a beam which will follow at very high frequencies. Such cathode ray tubes are usually of the high vacuum type having very little gas to retard the progress of the electron stream even at very high frequencies. Such tubes are operable quite readily at radio frequencies of 300 megacycles per second which is well within the range of operation of the present system.

The cathode ray tube 13 is quite similar to the usual type of tube, it being provided with two pair of static deflecting plates 14, 15, 16 and 17 and an anode gun or tube 18 which has a cylindrical opening through which the beam passes, a control grid 19, and a filament or cathode 20. Besides these elements the tube may have a metallic deposit over the flare inside surface of the bulb for establishing electrostatic field conditions necessary for focusing the electron beam although if the beam may be properly focused without such a special anode, this may be dispensed with.

In addition to the above elements, the tube is provided with a metallic plate or strip 21 which is preferably seated on the inside of the flat end 22 of the tube. The plate or strip 21 is conductive and may be rectangular as indicated in the figure or may form a sector, depending to some extent upon the exact use to which the system is applied.

The electrode or strip 21, as indicated, is connected by the wire 23 to the pulse amplifier 6, the pulse amplifier being connected also by the wire 24 to the ground 80. In this way when the electron beam impinges upon the strip 21 a current will be set up in the pulse amplifier 6 which will react to control the operation of the transmitter 1.

The inside of the face 22 of the tube may be provided with a fluorescent screen in the usual fashion while the outside of the face of the tube may be provided with a scale as indicated in Fig. 2. The pair of plates 14, 15, 16 and 17, respectively, are controlled and operated by a sweep circuit oscillator 25 which is preferably chosen to impress a sinusoidal voltage on the pair of plates to create a rotating beam. However, if the shape of the tube were changed or even if the shape of the tube were not changed, a sweep circuit might be used in which a different pattern of the beam is obtained. This obviously would depend upon the relative positions of the scale and the electrode 21 as will be learned from the description given below. The sweep circuit oscillator 25 is used preferably at radio frequencies although frequencies lower than radio frequencies may be employed, the adjustment of the frequency, as will be shown, limiting and being associated with the distance to be measured. The best range of frequencies for the sweep circuit in the present invention is that of the order of a frequency of 100 kilocycles and depends, as has been stated, upon the upper as well as the lower limit of distances to be measured. The sweep circuit oscillator in this respect may be adjusted so that the desired frequency within the range of operation of the apparatus may be obtained.

In order to reliably control the pattern of the beam, the potential of the plates 14, 15, 16 and 17 and the anode 18 are kept at a ground potential and the cathode 20 is placed at the necessary potential below ground to produce the discharge of the electrons from the anode so that a proper beam may be produced.

In Fig. 2 the front end of the tube 13 is shown. The tube may be provided with an opaque annular portion 26 and a center opaque portion 27, leaving a ring 28 through which the electron beam may show on the fluorescent screen. The scale 29 may be and preferably is placed upon the outside of the ring 28 on the opaque surface 26.

In the modification shown in Fig. 4 the structure differs from that shown in Figs. 2 and 3 only in the fact that the strip is fixed in another position. The tube may be provided with a plate 33 which is spaced away from the front end of the tube so that there is no possibility of secondary conduction from the fluorescent surface 34 on the inside of the end of the tube. There is similarly provided on the outside of the tube an opaque center disc 35 and a ring 36 whereby a circular opening 37 will be provided. If necessary, the plate 33 may also be provided with a slightly negative potential to repel any secondary emission which may occur from the fluorescent screen 34. It should be noted that the strip is indicated in Fig. 2 as rectangular in shape. Any shape of strip may be employed, but it is preferable to use a strip or plate such that the angle subtended from the center of the indicator will be different for a different radius of the rotating beam. In this way by varying the size of the circle of the rotating beam, the length of signal will be controlled and varied, since if the angles subtended by the beam crossing the plate are different, the time during which the signal will be applied will also be different, and, therefore, either a longer or a shorter signal may be provided by varying the position of the rotating beam.

A further modification is shown in Fig. 5. In this figure the cathode ray tube 40 is provided with two plates 41 and 42 which may be in disc form, the plate 42 having an opening therein as indicated at 43. The plates may be connected together through a resistor 44 external of the tube, the plate 41 being grounded at 45 and the connection at the plate 43 going to the grid 46 of a control tube whose filament 47 is connected to the ground 45. When the electron beam 48, as indicated by the arrow, passes through the opening 43 in the plate 42, the current which up to this time has flown through the plate 42 and the connecting lead 48, now flows through the plate 41 and the connecting lead 49. The potential thereby at the point 50 suddenly drops a value dependent upon the voltage across the resistor 44. This may be used to control or energize the grid 46. The grid 46 in the tube 80 may control the flow of plate current in the circuit by any well-known means as, for instance, through the transformer coupling 81, the secondary of which is connected to the cathode 20 and the grid 19.

In the modification shown in Fig. 6 the cathode ray tube 40 is provided with a plate 61 positioned somewhat close to the fluorescent screen 62 on the inside end of the tube. An electrode 63 is provided which may be a plate or a strip somewhat as indicated in Fig. 4. The plate 61 may be flat or is preferably provided with a turned-back flange. The electrode 61 is connected to the grid 64 and also to the resistor 65 which is in circuit with the battery 66 and ground 67.

A variable tap 68 may be provided for the cathode 69 of the tube. In the operation of the tube the electron beam is rotated and is not interrupted until it is intercepted by the electrode 63. At other times than when the beam is interrupted a secondary emission occurs from the fluorescent screen 62 which causes an electron flow between the screen 62 and the plate 61. This flow is interrupted at the instant that the beam hits the electrode 63 and at such times the current through the resistor 65 reduces to zero. The potential, therefore, of the grid 64 drops to that of the plus side of the battery 66. This short drop may be used to control the current in the transmitting circuit. The grid 64 may control the grid of the cathode ray tube in a manner similar to that described in connection with Fig. 5 through the transformer coupling element 81.

In the operation of the general system as set forth in Fig. 1 the sweep circuit rotates the electron beam continuously at a velocity dependent upon the frequency of oscillation. With an oscillating frequency of, for instance, 150 kilocycles per second, the beam will make one revolution of the scale in $1/150,000$ of a second. If the beam crosses strip 21 at such a radius as to subtend an angle of, say, two degrees, the pulse amplifier will be energized from the beam for $1/180$ of $1/150,000$ of a second or for a time interval of $1/27,000,000$ of a second or for approximately $4 \times 10^{-8}$ seconds. The pulse amplifier is adapted to control and handle an impulse of this character and for this reason has a broad tuning range within a wave length of from 10 to 25 meters. This, in fact, may be adjustable to correspond to the time interval created by the duration of the impulse it receives. The impulse received by the pulse amplifier 6 will be impressed upon the grids 4 and 5 of the transmitter and allow it to oscillate for the time interval that the impulse exists.

If the wave length of the transmitter is 60 cms., the frequency will be 500,000 kilocycles per second, and for a time interval of $4 \times 10^{-8}$ seconds, it will be evident that there will be 20 cycles emitted by the transmitting oscillator 1. The waves radiated from the transmitting system and picked up by the receiving antenna 8 will be impressed upon the radio receiver 30 and then upon the amplifier 12 which may be tuned in the same manner as the pulse amplifier 6. The output of the amplifier 12 controls the control grid 19. The control grid 19 preferably has an initial potential which may be in the same direction as the received pulse or it may be in the opposite direction, depending upon the particular type of indication that is desired. If the received impulse acts in the same direction as the potential 32 upon the control grid 19, the tendency of the received impulse will be to decrease temporarily the radius of rotation of the electron beam since it will produce an increased velocity of the beam and therefore tend to keep the beam in the center of the scale.

On the other hand, if the potential 32 is in the other direction, the velocity of the beam will decrease and the radius of rotation of the beam will thereby increase. As has been stated above, the beam rotates continuously at the speed of the sweep circuit oscillator, sending out an impulse by control of the pulse amplifier 6 when it crosses the strip 21. The beam may at all times be within the center circular portion 27 until such instant when the received impulse acts upon the grid 19 in such a way as to momentarily cause the beam to appear in the ring 28. This will occur at the time of the receipt of the reflected impulse and if the scale is properly calibrated in distance will indicate momentarily the distance of the source from which the reflection is returned.

It is obvious, of course, that a single impulse would not be visible on account of the tremendous velocities involved and, in fact, the beam itself would not become visible unless the image remains sufficiently long or was repeated sufficiently often to produce an impression. At the present instant, however, since the sweep circuit is operated at approximately 150,000 times per second, there will be 150,000 impulses sent out from the transmitter each second and likewise 150,000 impressions or measurements of the distance every second.

Even if it is assumed that the position of the object relative to the measuring station is moving with the greatest velocity that is possible, since these velocities do not compare with the velocities involved in the present measurement and with the number of measurements per second, it is obvious that the relative position of the objects and the measuring station may be considered as stationary during any measuring interval. It should be noted that within the shortest period that the eye can register which we may assume as perhaps $1/100$ of a second, there will be 1500 measurements indicated in the same spot on the measuring scale. From this it readily follows that a continuous indication of distance will be obtained.

The scale 29 must be calibrated so that the values there represented are equivalent to the time of travel of the impulse from the transmitter to the reflecting surface and back to the receiver again. Since the velocity of the beam is dependent upon the sweep circuit oscillator 25, it follows that for any one scale a definite velocity of the beam is necessary or else a correction factor must be applied.

If the velocity of the beam is maintained at 150 kilocycles per second, then the full scale reading would correspond to 1000 meters, since in 1/150,000 of a second, the impulse would travel 2000 meters. If a second velocity of the sweep circuit is used, a second scale can be provided or in its place a conversion table to obtain the correct distance reading.

It will be noted that both transmitting and receiving units may be directional, in which case the direction of orientation of either the transmitter or the receiver, as indicated by the arrow 31, will indicate the direction of the reflecting source. If the echo is received and the transmitter is directive, the receipt of the echo will indicate that the transmitter is pointing in the right direction, and, similarly, if the transmitter is non-directive but the receiver directive, the direction that the receiver is pointing when an echo is returned will indicate the direction of a source. With both elements of direction and distance known, a distant craft, either aircraft or a vessel, may be plotted and its course determined.

Having now described my invention, I claim:

1. Means for measuring distance by means of electromagnetic waves which comprises means for transmitting high frequency electromagnetic waves of approximately one meter, means for controlling the emission of said electromagnetic waves at definite time intervals including an electron beam, means for receiving said impulses after reflection from the surface whose distance is to be measured, means for causing the received impulse momentarily to deflect the course of said electron beam and means cooperating with the momentarily deflected beam for producing an indication of the distance from said surface.

2. A method of measuring distance by the aid of electromagnetic waves including a cathode ray tube provided with a keying plate which comprises providing a rotating cathode ray beam and sending out a short radio impulse of very high frequency only when the beam of the cathode ray tube crosses the plate, receiving the reflected impulse on the receiving circuit and affecting thereby upon receipt of the electromagnetic impulse the movement of the electron beam whereby an indication is produced.

3. A method of measuring distance by the aid of electromagnetic waves with the use of a cathode ray tube having an electron beam, means for rotating said beam and a plate positioned to intercept the electron beam in its movement which comprises transmitting an electromagnetic wave of a frequency approximately one meter only when the beam crosses the keying plate, allowing the rotation of the beam to serve as a measure of the time interval between the transmission of the impulse and the reception of the reflected impulse, impressing the energy of the received impulse to deflect the beam upon the reception of the reflected impulse whereby the space between the plate and the deflection of the beam serve as a measure of the distance.

4. In a system for measuring distance by the use of electromagnetic waves, a cathode ray tube having cathode, anode and control plate electrodes, an electrode positioned near the face of the tube, means providing a sweep circuit for rotating the electron beam at a definitely chosen frequency, a radiating circuit of a frequency approximately one meter, means associated with the electrode near the face of the tube for controlling the operation of the transmitting circuit through the rotation of the electron beam, a receiving circuit and means provided within said tube for causing a deflection of the beam upon the receipt of an electromagnetic impulse.

5. In a system for measuring distance by the use of electromagnetic waves, an indicator including a cathode ray tube having a rotating electron beam, means normally making the path of said beam visible and means operated at the moment of reception of a reflected wave for producing a dark spot in the visible path of said beam.

6. In a system for measuring distance by the use of electromagnetic waves, a cathode ray tube having a cathode, an anode and control-plate electrodes, an electrode positioned near the face of the tube, means providing a sweep circuit for rotating the electron beam at a definitely chosen radio frequency, a radio-transmitting device, means controlling the operation of said transmitting device, said means being connected to said electrode near the face of the tube, a receiving circuit and means provided within said tube for causing a variation in the beam upon receipt of an electromagnetic impulse.

7. In a system for measuring distance by the use of electromagnetic waves, a cathode ray tube having a cathode, an anode and control-plate electrodes, an electrode positioned near the face of the tube, means providing a sweep circuit for rotating the electron beam at a definitely chosen frequency, means provided at the end of the tube for producing a visible illuminated circle by the action of the beam thereon, a transmitting circuit and means controlled by the electrode near the face of the tube for operating the transmitting circuit at the moment the beam crosses it, a receiving circuit and means connecting said receiving circuit to said tube for varying the illumination of said circle by controlling the intensity of said beam upon the face of the tube.

8. A method of measuring distance which comprises generating a rotating beam of electrons having a high frequency of rotation, generating a train of high frequency electromagnetic waves, controlling the emission of said train by a conductive path comprising said beam of electrons, receiving the train of electromagnetic waves after reflection from the surface of an object the distance of which is to be measured, deriving a controlling impulse of energy from said received train of waves in a time interval proportional to the distance traversed by the reflected wave train, and deflecting the rotating beam of electrons by said controlling impulse.

9. An apparatus for measuring distance comprising means for generating a rotating non-planar beam of electrons, means for transmitting a train of electromagnetic waves, means operatively associating said beam of electrons in its rotation with said transmitting means for controlling the instant of emission of said train, means for receiving the aforesaid train of waves after reflection from the surface of an object the distance of which is to be measured, and means responsive to said receiving means for causing a visual deflection of the rotating beam of electrons corresponding to the moment of the reception of the train of electromagnetic waves.

ROBERT W. HART.